(No Model.)
J. BISHOP.
CARD GRINDER.
No. 386,521. Patented July 24, 1888.
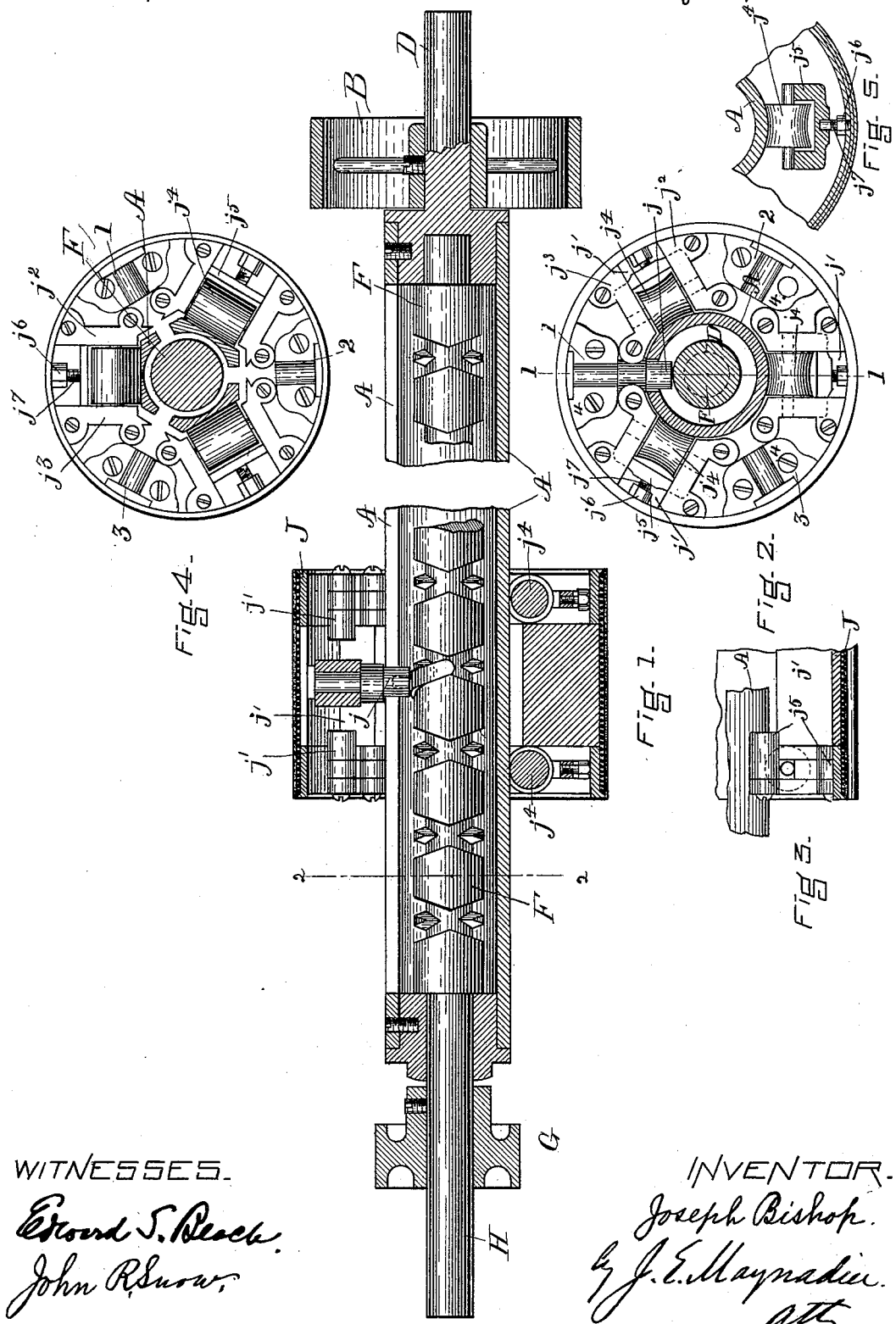
WITNESSES.
Edward T. Beach.
John R. Snow.
INVENTOR.
Joseph Bishop.
by J. E. Maynadier.
atty.

United States Patent Office.

JOSEPH BISHOP, OF WESTBROOK, MAINE, ASSIGNOR TO HIMSELF AND WOODBURY KIDDER DANA, OF SAME PLACE.

CARD-GRINDER.

SPECIFICATION forming part of Letters Patent No. 386,521, dated July 24, 1888.

Application filed June 9, 1887. Serial No. 240,693. (No model.)

*To all whom it may concern:*

Be it known that I, JOSEPH BISHOP, of Saccarappa, in the town of Westbrook, in the county of Cumberland and State of Maine, have invented an Improved Card-Grinder, of which the following is a specification, reference being had to the accompanying drawings, making a part hereof, in which—

Figure 1 is a central longitudinal section; Fig. 2, a view, partly in section, on line 2 2 of Fig. 1. Figs. 3 and 5 are details, partly in section, and Fig. 4 is a view, partly in section and showing a modification.

My invention is the means for preventing the lost motion or backlash of the grinding-drum and adjusting it concentrically with its shaft; and it consists in the combination of the drum with its shaft by means of adjustable rollers, as more fully explained below.

In the drawings, the hollow shaft A, pulley B, and journal D are rigidly connected, so that power applied through pulley B rotates the shaft A and its journal D. Within the hollow shaft A is the endless screw F, which is rigidly connected to pulley G and journal H, so that power applied through pulley G rotates the endless screw and its journal H. The hollow shaft A is slotted lengthwise to receive the dog $j$ of the grinding-drum J. All these parts are the same as in grinders which have been in general use for many years, and with which all skilled in the art are familiar.

My grinder differs from all others in the means for connecting the drum J with shaft A. The drum has cast upon or otherwise secured to it three projections, $j'$, and to these projections are secured the bearers $j^2$, which, with the bearers $j^3$, receive and keep in place the antifriction roll $j^4$ and the adjustable yoke $j^5$. The yoke $j^5$ is adjusted by the nut $j^6$ and its screw $j^7$. It will be seen that there are three pairs of rolls, $j^4$, and that each roll is adjustable, so that by the adjustment of these rolls the drum may be made exactly concentric with shaft A, and also made to fit so snugly as to be free from backlash or lost motion, and yet be readily moved lengthwise of shaft A by the dog $j$ and the endless screw F. When the drum J becomes slightly loose from wear, a slight readjustment is readily made by turning the nuts $j^6$, overcoming all the ill effects of wear.

The projections 1 2 3 in the drum J serve, one of them to hold the dog $j$, and the other two to preserve the balance. I prefer to fit each one for the cap 4, so that the dog can be shifted to either one of these projections from time to time.

The shaft A has heretofore been a hollow cylinder, as shown in Figs. 1, 2, 3, and 5; but when the drum J is secured to it by my invention the shaft A may be six-sided, as shown in Fig. 4. The advantage is that the strain on the dog is reduced, as the dog in this case has no other duty than to move the drum J endwise, while with the shaft A cylindrical the dog also acts as a spline to compel the drum J to revolve with the shaft A. The dog can enter either one of the three slots shown in Fig. 4, as will be obvious without detailed description.

The grinder illustrated in Fig. 4 is in all respects the same as that shown in the other drawings, except that the shaft A is six sided and has three slots, and except, also, that the rollers $j^4$ are cylinders, instead of being hollowed to fit the cylindrical surface of shaft A, as in the other figures.

I am aware of Hardy's patent, No. 63,884, dated April 16, 1867, and Brown's patent, No. 217,444, dated July 15, 1879, and disclaim all that is shown in them.

What I claim as my invention is—

In a card-grinder, hollow shaft A, having a lengthwise slot, screw F, and drum J, provided with a dog, $j$, which engages screw F through the lengthwise slot in shaft A, in combination with rollers $j^4$, which are intermediate drum J and shaft A, and keep the drum out of contact with the shaft, substantially as and for the purpose set forth.

JOSEPH BISHOP.

Witnesses:
FRANK HASKELL,
ARTHUR W. RICKEN.